(12) United States Patent
Dillen et al.

(10) Patent No.: US 6,892,701 B2
(45) Date of Patent: May 17, 2005

(54) METHOD AND APPARATUS FOR CONTROLLING LOCOMOTIVE SMOKE EMISSIONS DURING TRANSIENT OPERATION

(75) Inventors: Eric R. Dillen, Erie, PA (US); Shawn M. Gallagher, Erie, PA (US); Vincent F. Dunsworth, Edinboro, PA (US); Joseph T. Orinko, Erie, PA (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 10/352,487

(22) Filed: Jan. 28, 2003

(65) Prior Publication Data

US 2004/0145187 A1 Jul. 29, 2004

(51) Int. Cl.[7] .................... F02D 31/00; F02P 5/00; F02M 37/04
(52) U.S. Cl. .................. 123/357; 123/500; 123/406.46; 123/352
(58) Field of Search ............... 290/40 C, 41, 290/51, 52; 477/3; 180/65.3; 60/599, 285; 123/500, 380, 563, 501, 357, 565, 352–355, 406.46, 305, 481, 485, 568.21, 564

(56) References Cited

U.S. PATENT DOCUMENTS

| | | | |
|---|---|---|---|
| 4,530,332 A | | 7/1985 | Harvey et al. .............. 123/481 |
| 4,552,114 A | | 11/1985 | Sano et al. .................. 123/481 |
| 4,634,887 A | * | 1/1987 | Balch et al. .................... 290/3 |
| 4,945,869 A | | 8/1990 | Klomp ........................ 123/734 |
| 5,553,575 A | | 9/1996 | Beck et al. ............... 123/198 F |
| 5,826,563 A | * | 10/1998 | Patel et al. .................. 123/481 |
| 6,158,416 A | * | 12/2000 | Chen et al. .................. 123/380 |
| 6,283,100 B1 | * | 9/2001 | Chen et al. .................. 123/563 |
| 6,286,480 B1 | * | 9/2001 | Chen et al. .................. 123/380 |
| 6,308,639 B1 | * | 10/2001 | Donnelly et al. .............. 105/50 |
| 6,325,044 B1 | * | 12/2001 | Chen et al. .................. 123/357 |
| 6,341,596 B1 | * | 1/2002 | Dillen et al. ................. 123/500 |
| 6,405,705 B1 | * | 6/2002 | Dunsworth et al. .......... 123/305 |
| 6,415,606 B1 | * | 7/2002 | Bowman et al. .............. 60/608 |
| 6,725,134 B2 | * | 4/2004 | Dillen et al. ................. 701/19 |
| 6,823,835 B2 | * | 11/2004 | Dunsworth et al. .......... 123/305 |
| 2002/0195087 A1 | * | 12/2002 | Dunsworth et al. .......... 123/481 |

FOREIGN PATENT DOCUMENTS

JP 63-154840 6/1988

* cited by examiner

Primary Examiner—Darren Schuberg
Assistant Examiner—Julio C. Gonzalez
(74) Attorney, Agent, or Firm—Carl A. Rowold; John L. DeAngelis, Jr.; Beusse BrownLee Wolter Mora & Maire, P.A.

(57) ABSTRACT

A method and apparatus for reducing the smoke emissions of a railroad locomotive during throttle notch changes. For certain throttle notch increases the present invention advances the engine timing angle and controls application of the load at the new throttle notch position, according to certain predetermined parameters. These strategies, when used together or separately, minimize visible smoke during transient operation.

37 Claims, 2 Drawing Sheets

METHOD AND APPARATUS FOR CONTROLLING LOCOMOTIVE SMOKE EMISSIONS DURING TRANSIENT OPERATION

BACKGROUND OF THE INVENTION

The present invention is directed in general to an apparatus and method for decreasing the locomotive smoke emissions when the operator advances the locomotive throttle position, and more specifically to an apparatus and method that delays the application of load to the engine and modifies engine timing.

Recent amendments to United States environmental statutes and regulations require lowering of the permitted emissions from locomotive diesel engines, including visible smoke. One such requirement is the reduction in $NO_x$ emissions, which can be effected by retarding the fuel injection timing of a locomotive diesel engine. But this timing modification negatively impacts fuel consumption and, therefore, it is desirable to increase the engine compression ratio to gain back some of the fuel consumption losses.

However, increasing the compression ratio also increases the visible smoke emissions at partial engine loading. The problem of visible smoke is especially acute during transient load and speed changes, i.e., when the locomotive operator advances the throttle (i.e., moves the throttle to a higher notch position) to call for higher speed and/or greater load pulling capacity (i.e., locomotive horsepower). The smoke emissions tend to be worse when the throttle is advanced to higher throttle positions when starting from lower positions.

In the prior art locomotives, when the throttle is advanced from one position to the next (where the throttle positions are commonly referred to as notches) the diesel engine speed and the load (or current excitation) applied to the traction motors are simultaneously increased to the speed and horsepower point of the new notch position. In response to the notch position change the engine acceleration to the new speed point is controlled by an electronic governing unit. Also, the locomotive control system applies more excitation current to the main alternator, which in turn supplies more current to the traction motors, increasing the motor horsepower. While the speed and load are increasing to their new respective points, the fuel injection timing is determined from a look-up table based on engine speed. As discussed above, during these notch or transient changes, undesirable smoke emissions are produced.

In the prior art locomotive systems, the electronic governing unit acts as the speed governor in response to speed changes requested by the locomotive control system. In the prior art, the speed governor does not receive a signal from the throttle when it is changed from one notch position to another and therefore does not know when a notch change has occurred; the speed governor knows only the engine speed demand. In fact, there are multiple notch settings that vary the horsepower delivered by the traction motors, but not the engine speed.

BRIEF DESCRIPTION OF THE INVENTION

The above-mentioned undesirable visible smoke emissions during throttle notch changes (also referred to as transients) can be mitigated by the present invention, relating to a novel and nonobvious apparatus and method for controlling the engine timing and load application to favorably impact the visible smoke emissions during engine transients.

According to the teachings of one embodiment of the present invention, a parameter indicative of an increase in throttle notch setting is monitored and data representative of the notch increase is provided to a locomotive controller. In response, a locomotive electrical power generator is controlled to apply additional load on the engine as a ramp function over a predetermined period of time, so as to reduce emissions from the engine as the engine responds to the increased load.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE INVENTION

Figure 1:
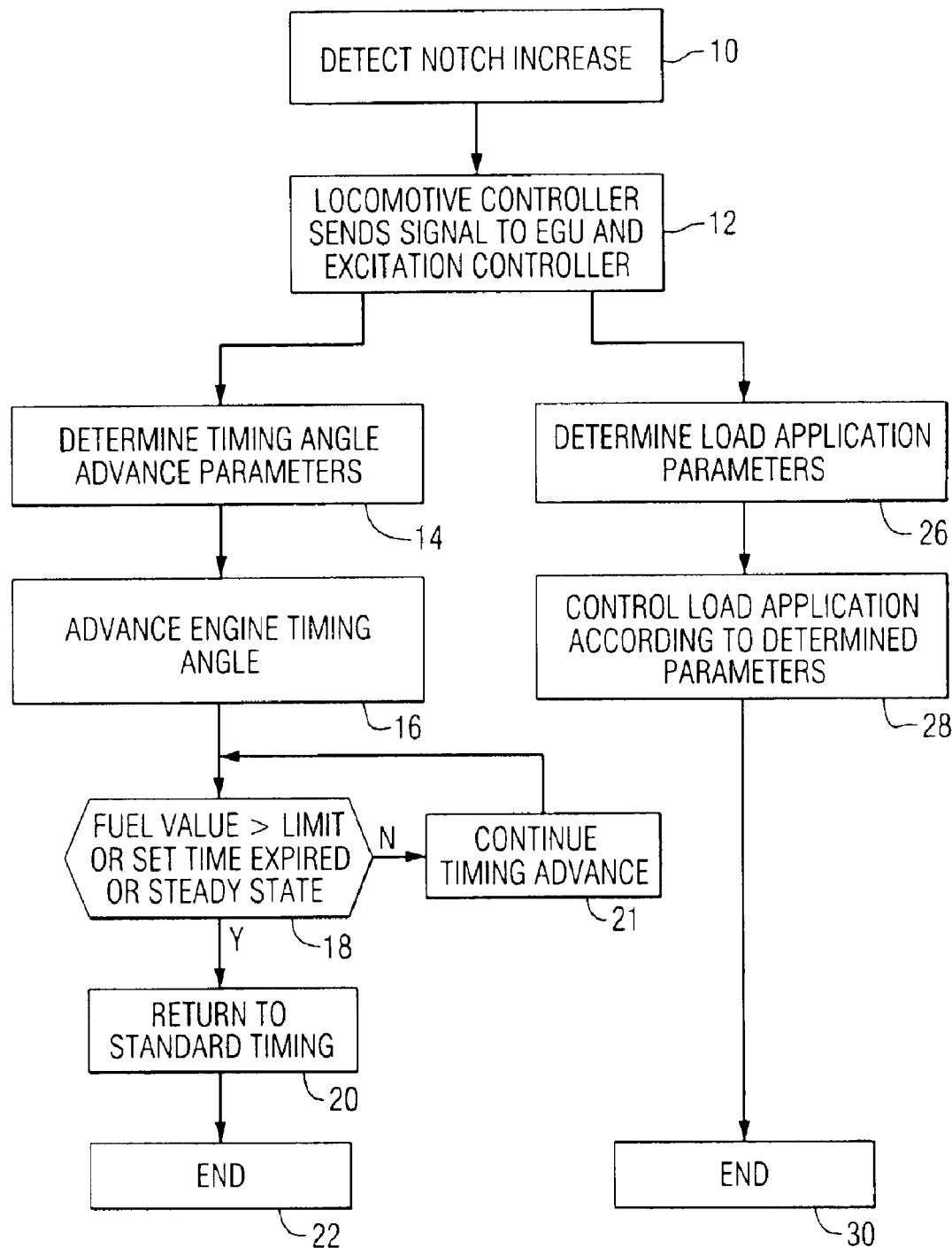
FIG. 1 is a flow chart illustrating the operation of the present invention.

Before describing in detail the particular transient smoke reduction system in accordance with the present invention, it should be observed that the present invention resides primarily in a novel combination of steps and apparatus related to smoke reduction in a railroad locomotive. Accordingly, these hardware components and method steps have been represented by conventional elements in the drawings, showing only those specific details that are pertinent to the present invention, so as not to obscure the disclosure with structural details that will be readily apparent to those skilled in the art having the benefit of the description herein.

FIG. 1 is a flow chart illustrating the operation of the present invention. At a step 10, the locomotive operator's movement of the throttle handle toward a higher notch position is detected. A transient operational period ensues as the engine and locomotive operational parameters change to those commanded by the new notch position. There are several engine and locomotive operational parameters that can be monitored to detect a notch increase, including, for example, engine speed (revolutions per minute), engine acceleration excitation current to the traction alternator, engine horsepower, engine fuel value (the quantity of fuel injected into an engine cylinder), traction motor alternator output current and manifold air pressure (which is influenced by the turbine speed and thus the engine speed). In response to one or more of these monitored parameters, at a step 12, the locomotive control system (not shown in FIG. 1) determines that a notch change has occurred and sends a representative signal to an excitation controller and an electronic governing unit (EGU) of the locomotive diesel engine. The excitation controller controls the current provided to the traction alternator field windings and thereby the affects the power (i.e., current) delivered by the traction alternator to the traction motors. The electronic governing unit controls the fuel value delivered to each engine cylinder and thereby affects the engine speed. Refer to commonly-owned U.S. Pat. No. 5,826,563; issued on Oct. 27, 1998, for further details of the excitation controller and electronic governing unit.

At a step 14, a timing angle look-up table is consulted to determine one or more of the various parameters that are used to govern the process of advancing the engine timing angle during the notch transient, with the result of limiting smoke emissions. At a step 16, the engine timing angle is advanced in accordance with the one or more parameters.

In one embodiment, the timing angle is not advanced immediately (i.e., not a step change), but instead is ramped (or slewed) from the current or base value to the desired value. When the monitored operational parameter that determined a notch change reaches a steady-state value, the engine timing advance angle is slewed back to the value associated with the new notch position.

There are several parameters that can be used to define the process of slewing to the final timing advance angle, and these parameters can be selected according to various embodiments of the present invention. One such parameter is the slew rate (or line slope), which in one embodiment is linear and is approximately ten degrees per second. This parameter is identified by a reference character 32 in FIG. 2. The slew rate can also follow a curvilinear curve. In another embodiment the slew rate is dependent on the operative notch position prior to the change initiated by the locomotive operator.

Figure 2:
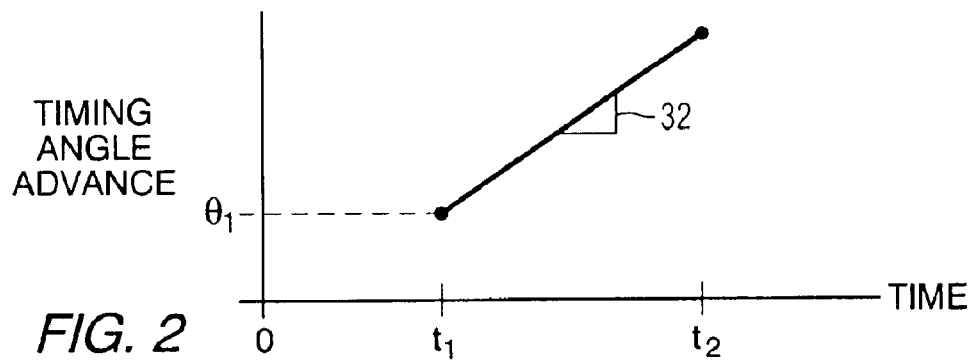
FIG. 2 illustrates an engine timing angle advance ramp function according to one embodiment of the present invention for limiting smoke emissions.

Also, the onset of the slew or ramp can be delayed by a predetermined time, as represented by a time period between time t=0 and $t_1$ in FIG. 2. The duration of the slew can also be selected as desired, as represented by an interval between t=0 and $t_2$. In another embodiment these slew parameters are determined as a function of the initial notch position, and thus as a function of the timing angle advance ($\theta_1$) at the initial notch position, as indicated in FIG. 2. These various slew parameters can be set forth in a look-up table or calculated from one or more functional equations. In one embodiment, the slew parameters can be modified for high-altitude operation of the locomotive. It is known that due to the lower air density at higher altitudes, the notch settings for high altitude operation have different speeds associated therewith than the notch settings for conventional operation.

It is known in the art that advancing the engine timing angle at high loads can cause excessive engine cylinder pressure. Thus, for a transient condition (i.e., a throttle notch position change) that ends in a high load condition, the timing angle can be returned to the nominal value before full load application is achieved. According to the present invention, this is accomplished by discontinuing the timing angle advance and returning to the nominal timing angle when the fuel value reaches a predetermined limit. This feature is implemented at a decision step 18 of FIG. 1, where the fuel value is compared to a predetermined fuel value limit. If that limit is exceeded, then the result from decision step 18 is true and processing moves to a step 20 where the timing angle is returned to its nominal value. At a step 22, the process terminates.

Alternatively, at the decision step 18 it is also determined whether a predetermined time duration for advancing the engine timing has expired. If the result is true, processing also continues to the step 20 where the timing angle is returned to the nominal value associated with the new notch position. Also, when a steady state condition is reached the engine timing advance angle returns to the advance angle of the new notch position.

As was the case with the increase in the timing advance angle at the step 16, here too at the step 20 it is not required to change the timing angle advance as a step function, but instead the timing angle can be ramped or slewed from the current value to the new value (as determined by the end notch position). In conjunction with this process of slewing to the new advance angle, the various slew parameters (e.g., slew rate, and delay until beginning of the slew interval) can be selected as desired. For example, in one embodiment the slew rate at the step 20 is two degrees per second.

If the result from the decision step 18 is false, processing moves to a step 21, which simply indicates that the advanced timing angle condition continues.

In an embodiment where one or more of the timing angle advance parameters (the slew rate, for example) are dependent on the final notch position, an operational parameter representative of the final notch position is required. This can be determined from the monitored locomotive operational parameters, as described above in conjunction with the step 10 of FIG. 1.

Returning to FIG. 1, the right branch illustrates the process by which, according to the teachings of the present invention, the application of the additional load associated with the new notch position is controlled, that is, the load may not be applied instantaneously (which would be accomplished by using a step function to control the load application). Once a notch change has been detected, initiating a transient operational condition, as described above in conjunction with the step 10, at a step 26 one or more parameters governing the application of a new load value are determined. At a step 28 these parameters are operative to control the load application. Once the full load at the new notch position has been applied, the load application control process ends at a step 30.

Figure 3:
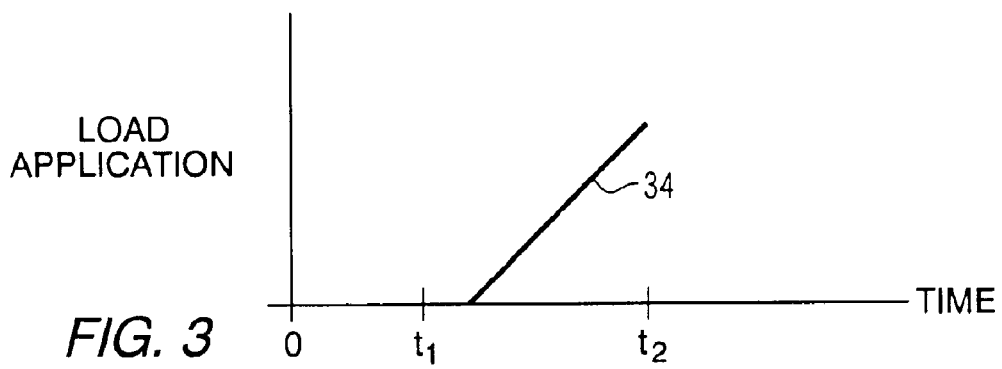
FIG. 3 illustrates a load application ramp function according to one embodiment of the present invention for limiting smoke emissions; depicts a load application parameter according to one embodiment of the present invention for limiting smoke emissions.

In one embodiment the operative load application parameter is simply delaying the load application for a predetermined time. In this embodiment, the delay period can be determined from a look-up table. Typical delay times are generally less that about 10 seconds, measured from the onset of transient operation In another embodiment, the additional load can be applied as a ramp function over a predetermined period of time following the indication of a notch increase, i.e., transient operation. The ramp can be a linear or a curvilinear function over the predetermined time. The predetermined time period can be based on the degree of notch change (i.e., the number of notch settings between the initial throttle position and the final throttle positions). Also, the initiation of the ramp function (i.e., application of the additional load) can be delayed based on the degree of notch change. The slew rate (or the slope of the ramp) can also selected, and in one embodiment is based on the degree of notch change. A representative ramp function 34 is illustrated in FIG. 3, where it is assumed that a notch increase is detected at $t_1$. In an embodiment where one or more of the load application parameters are dependent on the final notch position, an operational parameter representative of the final notch position is required. This can be determined from the monitored locomotive operational parameters, as described above in conjunction with the step 10 of FIG. 1.

Figure 4:
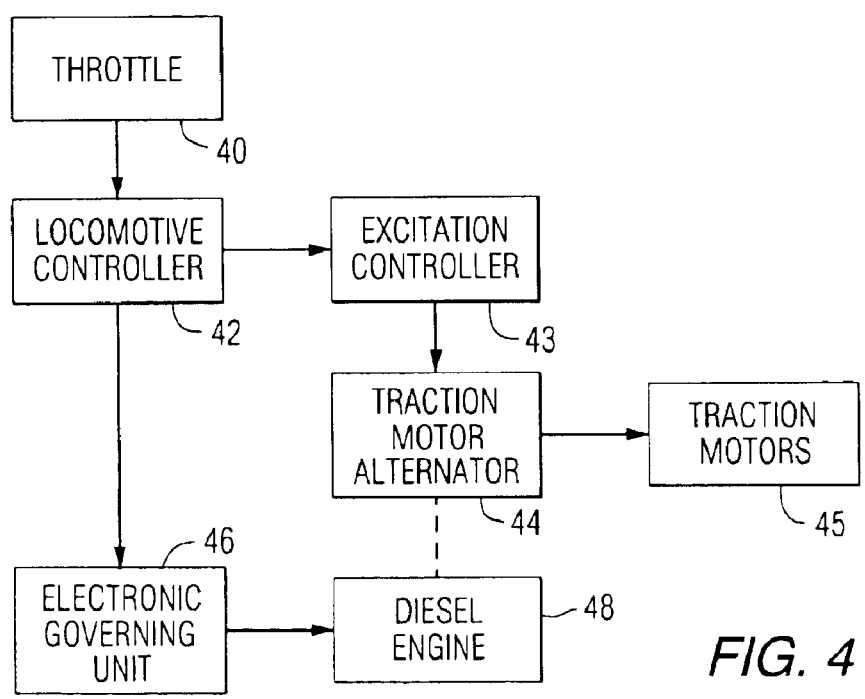
FIG. 4 is a block diagram of locomotive components associated with the present invention.

FIG. 4 illustrates the hardware elements associated with the present invention. A throttle 40, including the notch positions discussed above, is controlled by the locomotive operator. In one embodiment, when the operator moves the throttle handle from one position to another, a signal indicating that change is supplied to the locomotive controller 42. In other embodiments, various engine and locomotive operational parameters are monitored to detect a notch change. In response to a notch change, and in accordance with one or more of the load application delay parameters determined at the step 26, the locomotive controller 42 controls an excitation controller 43, which in turn supplies excitation current to a traction alternator 44. The output current of the traction alternator is supplied as an input current to the traction motors 45 for developing the horsepower associated with each notch position.

Also in response to an indication of a throttle notch adjustment, the locomotive controller 42 sends a corresponding signal to the electronic governing unit 46. The electronic governing unit 46 controls the engine speed as discussed in conjunction with the flow chart of FIG. 1. The engine timing angle is advanced in response to the timing angle advance parameters determined at the step 14.

The flow chart of FIG. 1, including determining the parameters associated with the timing angle advance and the load application delay, can be executed by a processor, such as a computer. This implementation is well known in the art, and in fact the processor can be embodied within the locomotive controller 42 and the electronic governing unit 46 shown in FIG. 4. Instructions in a read-only memory control operation of the processor and in an exemplary embodiment the flow chart of FIG. 1 can be set forth in a random access memory. Execution of the FIG. 1 flowchart includes the generation of control signals input to the diesel engine 48 and the excitation controller 43, as shown in FIG. 4.

Additional details of certain aspects of the present invention are set forth in commonly-owned U.S. Pat. No. 6,341,596, which is hereby incorporated by reference.

While the invention has been described with reference to a preferred embodiment, it will be understood by those skilled in the art that various changes may be made and equivalent elements may be substituted for elements thereof without departing from the scope of the present invention. In addition, modifications may be made to adapt a particular situation or application to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What it claimed is:

1. A method of controlling the operation of a railroad locomotive to reduce emissions during a load transient mode of operation as the engine responds to increased loading, the locomotive comprising a plurality of wheels, traction motors for driving the wheels, a diesel engine having a plurality of cylinders, an electric power generator coupled to the diesel engine for generating and supplying electrical power to the traction motors for driving the wheels, a throttle for controlling operation of the locomotive, with the throttle being movable through discrete throttle notch settings for controlling the level of electric power generated and the resultant load on the engine, with each notch setting corresponding to a unique level of electrical power generated at the electric power generator and with higher notch settings corresponding to higher levels of electrical power generated, wherein during operation of the locomotive the operator increases the notch setting from an initial notch setting for generating more electrical power with a resultant increase in the load applied to the engine, the method comprising:

monitoring a parameter indicative of an increase in throttle notch setting;

transmitting data representative of the increase in notch setting to a locomotive controller; and controlling the operation of the electrical power generator via the locomotive controller in response to the data representative of the increase in notch setting to control the application of additional load on the engine as a ramp function over a predetermined period of time after an increase in notch setting so as to reduce emissions from the engine as the engine responds to the increased load.

2. The method of claim 1 wherein the ramp function is linear over the predetermined period of time.

3. The method of claim 1 wherein the ramp function is curvilinear over the predetermined period of time.

4. The method of claim 1 wherein the amount of predetermined time is based at least in part on one or both of the initial notch setting and the degree of increase in notch setting.

5. The method of claim 1 wherein the initiation of the ramp function is delayed a delay period after the increase in notch setting.

6. The method of claim 5 wherein the delay period is based at least in part on one or both of the initial notch setting and the degree of increase in notch setting.

7. The method of claim 1 wherein the rate of load increase of the ramp function is based at least in part on one or more of the initial notch setting and the degree of increase of the notch setting.

8. The method of claim 1 wherein the parameter indicative of a notch change is selected from among engine speed, engine acceleration, excitation current, engine horsepower, engine fuel value, traction alternator output current and manifold air pressure.

9. A method of controlling the operation of a railroad locomotive to reduce emissions during a load transient mode of operation as the engine responds to increased loading, the locomotive comprising a plurality of wheels, traction motors for driving the wheels, a diesel engine having a plurality of cylinders, an electric power generator coupled to the diesel engine for generating and supplying electrical power to the traction motors for driving the wheels, a throttle for controlling operation of the locomotive, with the throttle being movable through discreet throttle notch settings for controlling the level of electric power generated and the resultant load on the engine, with each notch setting corresponding to a commanded speed of engine operation and a unique level of electrical power generated at the electric power generator and with higher notch settings corresponding to higher levels of electrical power generated, wherein during operation of the locomotive the operator increases the notch setting from an initial notch setting for generating more electrical power with a resultant increase in the load applied to the engine, the method comprising:

monitoring a parameter indicative of a commanded speed of operation of the engine corresponding to an increase in throttle notch setting;

transmitting data representative of the commanded speed of operation of the engine;

monitoring a parameter indicative of an actual speed of operation of the engine;

transmitting data representative of the actual speed of operation of the engine;

detecting when the commanded speed of operation exceeds the actual speed of operation to establish a load transient mode of operation;

transmitting data indicative of a load transient mode of operation to a locomotive controller; and controlling the operation of the electric power generator via the locomotive controller in response to the data indicative of a load transient mode to control the application of additional load to the engine as a ramp function over a predetermined period of time so as to reduce emissions from the engine as the engine responds to the increased load.

10. The method of claim 9 wherein the ramp function is linear over the predetermined period of time.

11. The method of claim 9 wherein the ramp function is curvilinear over the predetermined period of time.

12. The method of claim 9 wherein the amount of the predetermined time is based at least in part on the difference between the actual and commanded speeds of operation.

13. The method of claim 9 wherein the initiation of the ramp function is delayed a delay time after detecting when the commanded speed of operation exceeds the actual speed of operation.

14. The method of claim 13 wherein the delay time is based at least in part on the difference between the actual and the commanded speeds of operation.

15. The method of claim 9 wherein the rate of load increase of the ramp is based at least in part on the difference between the actual and the commanded speeds of operation.

16. The method of claim 9 wherein the parameter indicative of a actual speed of operation of the engine is selected from among engine acceleration, engine fuel value and manifold air pressure.

17. A method of controlling the operation of a railroad locomotive to reduce emissions during a load transient mode of operation as the engine responds to speed increase commands, the locomotive comprising a plurality of wheels, traction motors for driving the wheels, a diesel engine having a plurality of cylinders and at times operative at an advance engine timing angle, an electric power generator coupled to the diesel engine for generating and supplying electrical power to the traction motors for driving the wheels, a throttle for controlling operation of the locomotive, with the throttle being movable through discrete throttle notch settings for controlling the engine speed, with each notch setting corresponding to a commanded engine speed, with higher throttle notch settings corresponding to higher commanded engine speeds, wherein during operation of the locomotive the operator increases the notch setting from an initial notch setting for increasing the engine speed, the method comprising:
monitoring a parameter indicative of an increase in throttle notch setting;
transmitting data representative of the increase in notch setting to an engine controller; and
controlling the operation of the diesel engine via the engine controller in response to the data representative of the increase in notch setting to change the engine timing advance angle as a ramp function over a predetermined period of time following an increase in notch setting so as to reduce emissions from the engine as the engine responds to the commanded speed increase.

18. The method of claim 17 wherein the ramp function is linear over the predetermined period of time.

19. The method of claim 17 wherein the ramp function is curvilinear over the predetermined period of time.

20. The method of claim 17 wherein the amount of predetermined time is based at least in part on one or both of the initial notch setting and the degree of increase in notch setting.

21. The method of claim 17 wherein the initiation of the ramp function is delayed a delay period after the increase in notch setting.

22. The method of claim 21 wherein the delay period is based at least in part on one or both of the initial notch setting and the degree of increase in notch setting.

23. The method of claim 17 wherein the rate of advance timing angle increase of the ramp function is based at least in part on one or both of the initial notch setting and the degree of increase in notch setting.

24. The method of claim 17 wherein the parameter indicative of a notch change is selected from among engine speed, engine acceleration, excitation current, engine horsepower, engine fuel value, traction alternator output current and manifold air pressure.

25. A method of controlling the operation of a railroad locomotive to reduce emissions during a transient mode of operation as the engine responds to increased loading, the locomotive comprising a plurality of wheels, traction motors for driving the wheels, a diesel engine having a plurality of cylinders, an electric power generator coupled to the diesel engine for generating and supplying electrical power to the traction motors for driving the wheels, a throttle for controlling operation of the locomotive, with the throttle being movable through discrete throttle notch settings for controlling the engine speed and the level of electric power generated and the resultant load on the engine, with each notch setting corresponding to a commanded engine speed and a predetermined level of electrical power generated at the electric power generator and with higher notch settings corresponding to higher levels of electrical power generated, wherein during operation of the locomotive the operator increases the notch setting for generating more electrical power with a resultant increase in the load applied to the engine, the method comprising:
monitoring a parameter indicative of a commanded engine speed corresponding to a throttle notch setting;
transmitting data representative of the commanded engine speed;
monitoring a parameter indicative of an actual engine speed;
transmitting data representative of the actual engine speed;
detecting when the commanded engine speed exceeds the actual engine speed to establish a transient mode of operation;
transmitting data indicative of a transient mode of operation to a locomotive controller; and
controlling the operation of the diesel engine via the engine controller in response to the data representative of a transient mode to change the engine timing advance angle as a ramp function over a predetermined period of time so as to reduce emissions from the engine as the engine responds to the commanded speed increase.

26. The method of claim 25 wherein the ramp function is linear over the predetermined period of time.

27. The method of claim 25 wherein the ramp function is curvilinear over the predetermined period of time.

28. The method of claim 25 wherein the amount of the predetermined time is based at least in part on the difference between the actual and commanded engine speeds.

29. The method of claim 25 wherein the initiation of the ramp function is delayed a delay time after detecting when the commanded engine speed exceeds the actual engine speed.

30. The method of claim 29 wherein the delay time is based at least in part on the difference between the actual and commanded engine speeds.

31. The method of claim 25 wherein the rate of load increase of the ramp is based at least in part on the difference between the actual and commanded engine speeds.

32. The method of claim 25 wherein the parameter indicative of a actual speed of operation of the engine is selected from among engine acceleration, engine fuel value and manifold air pressure.

33. The method of claim 25 further comprising controlling the operation of the diesel engine via the engine controller when the actual engine speed is substantially equal to the commanded engine speed to change the engine timing advance angle as a ramp function to an advance angle associated with the commanded engine speed.

34. An apparatus for controlling the operation of a railroad locomotive to reduce emissions during a transient mode of operation as the engine responds to increased loading, the locomotive comprising a plurality of wheels, traction motors for driving the wheels, a diesel engine having a plurality of cylinders, an electric power generator coupled to the diesel engine for generating and supplying electrical power to the traction motors for driving the wheels, a throttle for controlling operation of the locomotive, with the throttle being movable through discrete throttle notch settings for controlling the level of electric power generated and the resultant load on the engine, with each notch setting corresponding to a unique level of electrical power generated at the electric power generator and with higher notch settings corresponding to higher levels of electrical power generated, wherein during operation of the locomotive the operator increases the notch setting for generating more electrical power with a resultant increase in the load applied to the engine, the apparatus comprising:

a locomotive controller for monitoring a parameter indicative of an increase in throttle notch setting; and an excitation controller responsive to the locomotive controller for controlling operation of the electrical power generator in response to the increase in notch setting to control the application of additional load on the engine as a ramp function over a predetermined period of time after an increase in notch setting so as to reduce emissions from the engine as the engine responds to the increased load.

35. The apparatus of claim 34 wherein the parameter indicative of an increase in throttle notch setting is selected from among engine speed, engine acceleration, engine fuel value and manifold air pressure.

36. An apparatus for controlling the operation of a railroad locomotive to reduce emissions during a transient mode of operation as the engine responds to speed increase commands, the locomotive comprising a plurality of wheels, traction motors for driving the wheels, a diesel engine having a plurality of cylinders and at times operative by advancing the engine timing advance angle, an electric power generator coupled to the diesel engine for generating and supplying electrical power to the traction motors for driving the wheels, a throttle for controlling operation of the locomotive, with the throttle being movable through discrete throttle notch settings for controlling the engine speed, with each notch setting corresponding to a commanded engine speed, with higher throttle notch settings corresponding to higher commanded engine speeds, wherein during operation of the locomotive the operator increases the notch setting from an initial notch setting for increasing the engine speed, the apparatus comprising:

a locomotive controller for monitoring a parameter indicative of an increase in throttle notch setting; and an engine controller responsive to the locomotive controller for controlling operation of the diesel engine in response to the increase in notch setting to change the engine timing advance angle as a ramp function over a predetermined period of time following an increase in notch setting so as to reduce emissions from the engine as the engine responds to the commanded speed increase.

37. The apparatus of claim 36 wherein the parameter indicative of an increase in throttle notch setting is selected from among engine speed, engine acceleration, engine fuel value and manifold air pressure.

\* \* \* \* \*